United States Patent
Ahrens et al.

(10) Patent No.: US 9,491,572 B2
(45) Date of Patent: Nov. 8, 2016

(54) METHOD AND APPARATUS FOR MESSAGE PROCESSING TO LOCATE NETWORK DEVICES

(75) Inventors: Werner Ahrens, Paderborn (DE); Heinrich Bartels, Paderborn (DE)

(73) Assignee: Unify GmbH & Co. KG, Munich (DE)

( * ) Notice: Subject to any disclaimer, the term of this patent is extended or adjusted under 35 U.S.C. 154(b) by 2377 days.

(21) Appl. No.: 11/664,175

(22) PCT Filed: Aug. 31, 2005

(86) PCT No.: PCT/EP2005/054289
§ 371 (c)(1),
(2), (4) Date: Mar. 29, 2007

(87) PCT Pub. No.: WO2006/034939
PCT Pub. Date: Apr. 6, 2006

(65) Prior Publication Data
US 2008/0109819 A1    May 8, 2008

(30) Foreign Application Priority Data

Sep. 29, 2004 (DE) .......................... 10 2004 047 352

(51) Int. Cl.
*G06F 15/16* (2006.01)
*H04W 4/02* (2009.01)
*H04L 29/08* (2006.01)

(52) U.S. Cl.
CPC ................ *H04W 4/02* (2013.01); *H04L 67/18* (2013.01); *H04L 67/30* (2013.01); *H04L 69/329* (2013.01); *H04L 67/24* (2013.01); *H04L 67/306* (2013.01)

(58) Field of Classification Search
CPC ................. H04N 2005/4441; H04N 21/2408; H04L 12/1859; H04L 67/327; H04W 64/00; H04W 64/003; H04W 76/021; H04W 8/20

USPC ........................................ 709/204, 203, 224
See application file for complete search history.

(56) References Cited

U.S. PATENT DOCUMENTS

| | | | |
|---|---|---|---|
| 7,139,820 B1* | 11/2006 | O'Toole et al. .............. | 709/223 |
| 7,502,339 B1* | 3/2009 | Pirkola et al. ................ | 370/310 |
| 7,711,002 B2* | 5/2010 | Mukherjee et al. .......... | 370/467 |
| 7,844,055 B2* | 11/2010 | Mukherjee et al. .......... | 380/250 |
| 2002/0095486 A1* | 7/2002 | Bahl ............................. | 709/223 |
| 2011/0294472 A1* | 12/2011 | Bramwell .............. | H04W 8/04 |
| | | | 455/413 |

FOREIGN PATENT DOCUMENTS

| | | |
|---|---|---|
| DE | 601 00 574 T2 | 9/2001 |
| WO | WO 00/79761 A1 | 12/2000 |
| WO | WO 03/003653 A2 | 1/2003 |

* cited by examiner

*Primary Examiner* — Hitesh Patel
(74) *Attorney, Agent, or Firm* — Buchanan Ingersoll & Rooney PC

(57) ABSTRACT

In one aspect, a communication system comprising a message processing computer and a plurality of communication networks, respectively provided with an interface computer that is respectively coupled to the message processing computer in order to reproduce a data flow between the respective interface computer and the message processing computer is provided. In another aspect, a device in which at least one electronic file is requested, the device determines a request message on the communication appliance side, forms at least one communication network request message, and sends the communication network request message to the interface computer(s) in the communication network in question is provided.

19 Claims, 1 Drawing Sheet

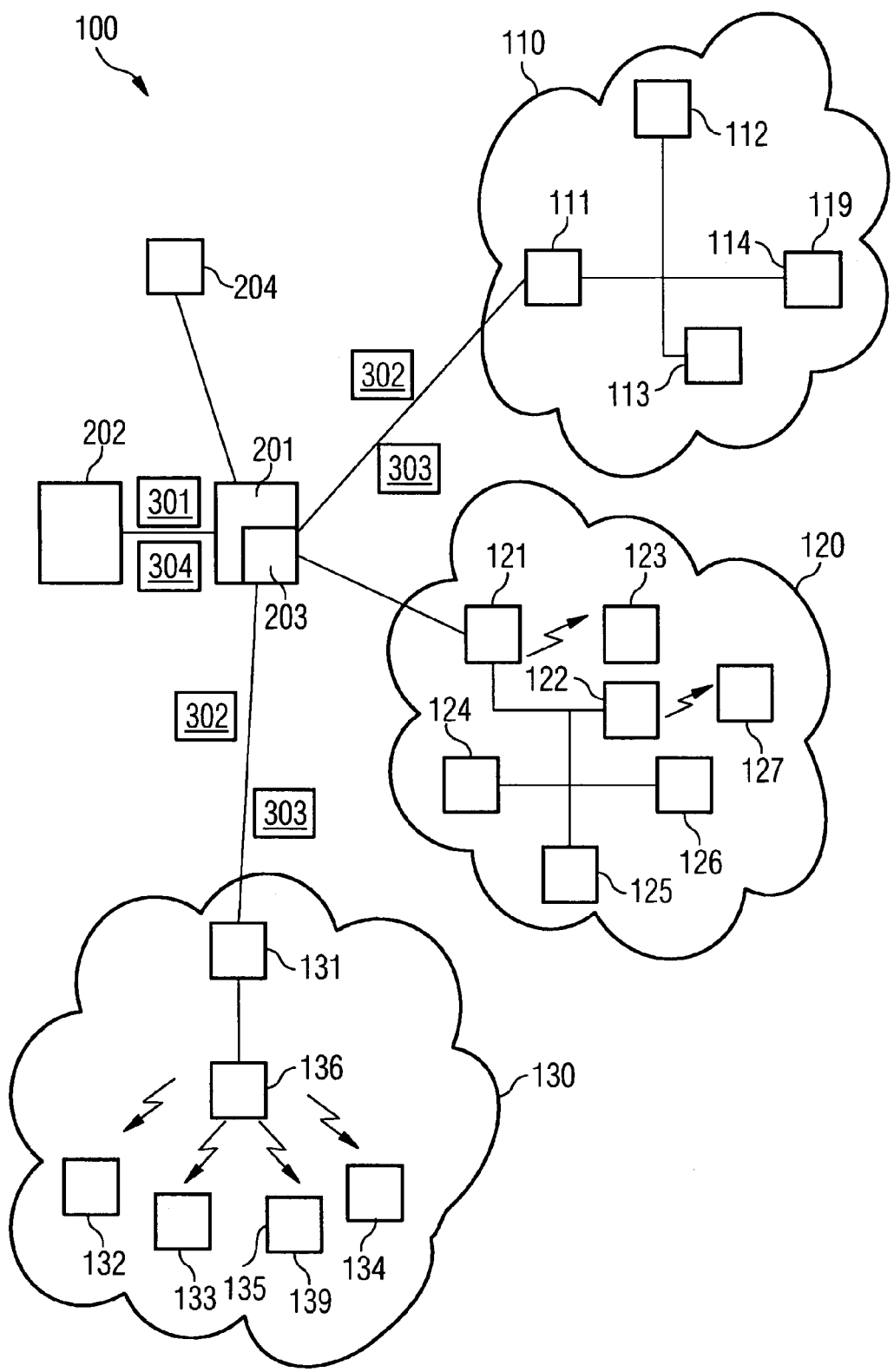

METHOD AND APPARATUS FOR MESSAGE PROCESSING TO LOCATE NETWORK DEVICES

CROSS REFERENCE TO RELATED APPLICATIONS

This application is the US National Stage of International Application No. PCT/EP2005/054289, filed Aug. 31, 2005 and claims the benefit thereof. The International Application claims the benefits of German application No. 102004047352.8 DE filed Sep. 29, 2004, both of the applications are incorporated by reference herein in their entirety.

FIELD OF INVENTION

The invention relates to a communication system comprising a message processing computer and a multiplicity of communication networks, each of which has an interface computer. The interface computers are connected to the message processing computer and are configured so as to reproduce a data stream between the respective interface computer and the message processing computer. The invention further relates to a message processing computer for use in such a communication system. The subject matter of the invention also relates to a method for processing a request message which is sent from a communication device to the message processing computer.

BACKGROUND OF INVENTION

A variety of communication networks currently exist, making use of different infrastructures and different protocols or transmission technologies for exchanging data with each other. Examples of such communication networks include Local Area Networks (LAN) and Wireless Local Area Networks (WLAN), both of which allow the interconnection of communication devices e.g. computers, which are arranged in a communication network, on the basis of the Internet Protocol (IP). In the field of telecommunications, communication networks include communication devices which function in accordance with the GSM standard (Group Special Mobile) and communication device which function in accordance with the DECT (Digital Enhanced Cordless Telecommunication) or UMTS (Universal Mobile Telecommunications System) standards.

In the following, any reference to a communication device is understood to include both mobile devices and devices which function with the aid of line-based technologies. The communication devices which are assigned to a communication network are also referred to as computers or subscriber devices in the following. While the term 'computer' represents an unspecified communication device, the term 'subscriber device' represents a specific communication device, e.g. a communication device which is assigned to a user.

SUMMARY OF INVENTION

In practice, a user will frequently use communication devices of different communication networks in parallel. In this case, however, it is not usually known which communication device in which communication network is being used by the user at a specific instant. In order to localize a user, e.g. in order to send data to this user, a plurality of attempts are often therefore required in order to find the exact current communication device. In this case, the sending of data is equivalent to a process in which an attempt is made to reach a telecommunication terminal for the purpose of a voice call. In this case, a problem frequently exists in that the searching entity (the user or the communication device assigned to the user) is not aware of all the possibilities whereby the sought entity (one of a plurality of subscriber devices) can be reached.

A further problem exists inter alia in that different identification codes are allocated to the user, or to the communication device which is assigned to the user, in each network. Identification codes can be, for example, the name of a sought person, a telephone number, an e-mail address or similar.

It would be desirable to localize a sought entity, which can be represented by a person or a communication device, without knowledge of the current infrastructure and using any identification code. In this case, it would be advantageous to eliminate the need to perform a plurality of position-finding or search attempts.

WO 00/79761 A1 discloses a method for the roaming of IP telephone subscribers in an IP telephone network, in which roaming between the networks is controlled with the aid of a Cell Visited Function in the PSTN or in the cellular network and a mobile telephone function. As part of a connection setup, an RN REG message (Roaming Number request message) including an IMSI is transferred from the Cellular Home Function to the Gateway Function. A STATUS ENG (Status Enquiry Message) is transferred from the Gateway Function to the MIPTN Visited Function (Mobile IP Telephone Network) in order to determine the status of the called subscriber device in the IP telephone network.

WO 03/003653 A2 discloses a gateway between a connectionless packet signaling network and a network using based on the Internet protocol, in which Presence Information is received from a message center of a wireless network and converted into IP protocol-compatible information and vice versa.

The present invention therefore addresses the problem of specifying a communication system and a message processing computer which satisfy the above-cited requirements. A method which satisfies these requirements must also be specified.

This problem is solved by a communication system, by a message processing, and by a method for processing a request message which has been sent from a communication device to a message processing computer as described in the claims.

Advantageous embodiments are derived in each case from the dependent patent claims.

The communication system according to the invention features a message processing computer and a multiplicity of communication networks, each of which includes an interface computer. The interface computers are linked to the message processing computer and are configured so as to reproduce a data stream between the respective interface computer and the message processing computer. Also provided is a facility of the message computer, said facility being configured such that, in the case of a request message which is transferred from a communication device and includes an identification code of a subscriber, provision is made for determining those communication networks in which subscriber devices of the subscriber who is indicated by the identification code are located, and communication network request messages for the relevant communication networks are formed and sent to the relevant interface computers.

A message processing computer according to the invention is configured such that, in the case of a request message which is sent from a communication device to the message processing computer and includes an identification code of a subscriber, provision is made for determining those communication networks, these being linked to the message processing computer via an interface computer in each case, in which subscriber devices of the subscriber who is indicated by the identification code are located, and communication network request messages are formed for the relevant communication networks and sent to the relevant interface computers.

In the inventive method for processing a request message which is supplied to a message processing computer from a communication device and includes an identification code of a subscriber, provision is made for determining those communication networks, these being linked to the message processing computer via an interface computer in each case, in which subscriber devices of the subscriber who is indicated by the identification code are located. Communication network request messages are formed from the request message and sent to the relevant interface computers.

In other words, for the purpose of localizing a sought entity (a person or a communication device which is assigned to the person) in one of the communication networks, the invention proposes that a request message which is formed by a searching entity (communication device) be transferred to a message processing computer, wherein said message processing computer is connected to the communication networks and forwards the corresponding search instruction to the communication networks in order eventually to be able to determine the desired information.

The advantage of this approach is that the searching entity, referred to as a communication device in the present application, does not require any knowledge of the infrastructure which is currently in use, i.e. the utilization of one of a multiplicity of communication networks. As a result of transferring the request message to a central unit, specifically the message processing computer, it is no longer necessary to carry out a search for each of the possible communication networks. Furthermore, by virtue of the centralization in the message processing computer, it is no longer necessary for the searching entity itself to interpret the results which are transferred by a multiplicity of communication networks. Using the invention, the sought entity is moreover no longer required, for each communication device in each of the communication networks, to make a manual entry in a database, this being provided within or outside of the communication network, in order to maintain the transparency of its current status for searching entities.

The request message advantageously contains the identification code of a subscriber device of at least one of the communication networks. On the basis of the identification code, which can represent e.g. one of a plurality of telephone numbers of a user, the name of a user, the e-mail address of a user or another identification, the message processing computer is able to find the relevant subscriber devices which are assigned to a sought user in the plurality of communication networks. On the basis of the identification code, therefore, it is possible to determine the communication networks in which a user is actually a subscriber and which specific identification codes for this communication network are relevant in each case.

In a further embodiment, the interface computers of each communication network, or alternatively a computer outside of the communication networks, contain information relating to the participation of a subscriber device in the communication network concerned. The check whether a sought entity is a subscriber of a communication network can therefore take place either by querying a database which is specifically for the relevant communication network in the communication system, e.g. the interface computer, or by submitting a query to a central database which has access to information concerning the subscribers of all communication networks in the communication system.

According to a further advantageous embodiment, the communication network request messages are formed according to a communication-network-specific protocol of the communication network concerned. If the interface computers of respective communication networks have the sole purpose of providing databases relating to the subscribers of the communication networks, said databases being used for queries from outside the communication network, it is possible to dispense with the provision of such specific protocols.

In an effective embodiment of the invention, the facility is configured such that, on the basis of the request message of the communication device, the identification code which is assigned to the subscriber device of the communication networks is determined and further processed.

According to a further advantageous embodiment, the further processing of the identification code can take place such that, if it is not possible to determine a communication device which is assigned to a subscriber who is indicated by the identification code, formation of a communication network request message does not occur. The check relating to the assignment can be done as described above by checking corresponding databases.

In a further embodiment, the facility of the inventive communication system is configured such that it detects response messages from the side of the interface computers or a computer outside of the communication networks, and forms a communication device response message therefrom, and sends it to the communication device. The communication device response message contains the information which was requested and desired by the communication device, said information indicating which communication device in which communication network is assigned to a sought entity, in order to obtain details relating to the location of the sought entity.

In a development, the facility is configured such that, from the response messages, parameters relating to the subscriber device of a communication network are determined and further processed. The further processing can consist in gathering all information from the plurality of communication networks and transferring it to the communication device which sent the request message.

In a further embodiment, provision is made for configuring the facility such that the parameters are evaluated. An evaluation comprises, for example, an analysis whereby the communication device which is currently being used in a communication network is considered to be a current location of a user, and the parameters which characterize this location are transferred to the communication device that sent the request message. Such a location specification can take the form of a textual designation, coordinates on a land map or the marking on a map. Parameters for evaluation can include, for example, "currently used communication device", "currently logged-on communication device", "last logon of the communication device", "time of last activity", etc. In this case, the evaluation also encompasses information concerning the precision of the location specification of a communication device in a communication network. For example, if two communication devices are currently active in two different communication networks (e.g. a GSM mobile radio telephone and a computer in a WLAN network), the information of that communication device which allows greater precision is used. In the cited example, this would be the transfer of the coordinates of the GSM mobile radio telephone, for example. The evaluation can therefore include a prioritization if information from a plurality of communication networks is transferred to the message processing computer. If a computer (in a WLAN or a LAN network) and a telephone (either a fixed network telephone or a mobile radio telephone) are being used at the same time, preference would be given to the information from the telephone communication networks.

For the purposes of the invention, the facility is arranged in the message processing computer.

The communication networks are represented by, for example, one of the following communication networks: a Local Area Network (LAN), a Wireless Local Area Network (WLAN), a Group Special Mobile (GSM) mobile radio network, a Universal Mobile Telecommunications System (UMTS) mobile radio network, a Future Public Land Mobile Telephone System (FPLMTS) mobile radio network, a Digital Enhanced Cordless Telecommunication (DECT) mobile radio network or a wire-based telecommunication system. The above list is not intended to be comprehensive but is merely intended to provide an example.

The message processing computer according to the invention has the same advantages as those described above in relation to the communication system.

In an embodiment, the message processing computer is configured such that it detects response messages from the side of the interface computers and forms a communication device response message therefrom, and sends this to a communication device.

In a further effective embodiment, the message processing computer is configured such that, from the response messages, it determines and further processes parameters relating to a subscriber device of a communication network.

The message processing computer is effectively configured such that, in the manner described above, it evaluates the parameters which relate to a subscriber device of a communication network.

The method according to the invention likewise offers the same advantages as those described in connection with the communication system according to the invention.

According to the invention, on the basis of the identification code, for every communication network which is linked to the message processing computer, a check ascertains whether the identification code can be assigned in each case to a subscriber device of the communication network. The check can take place by querying databases which are arranged either within or outside of the relevant communication networks.

In a further embodiment, a communication network request message specifically for each communication network is formed from the request message if an assignment of the identification code to a subscriber device of the relevant communication network is found. If the query that ascertains which identification code can be assigned to subscriber devices of which communication networks takes place in a central database outside of the communication networks, the communication network request message need only be transmitted to those communication networks for which a positive assignment is found. Depending on the configuration of the communication networks, and in particular of the interface computers which are arranged therein, the communication network request message can be formed in a specific protocol.

In a further embodiment, response messages from the side of the interface computers are detected, and a communication device response message is formed therefrom and sent to the communication device.

On the basis of the one or more response messages, provision is preferably made for determining and further processing parameters relating to a subscriber device of a communication network. Furthermore, provision is preferably made for evaluating the parameters and sending the result of the evaluation to the communication device.

BRIEF DESCRIPTION OF THE DRAWINGS

The invention is explained in greater detail below with reference to a sole FIGURE that illustrates an exemplary communication system.

DETAILED DESCRIPTION OF INVENTION

The FIGURE illustrates a communication system 100 according to the invention. This system features e.g. three communication networks 110, 120, 130, wherein each of the communication networks makes use of an individual infrastructure, including possibly different communication devices and possibly different data transmission techniques.

The communication network 110 thus represents, for example, a telecommunication system which operates in accordance with the GSM standard and features three communication devices 112, 113, 114 by way of example in the FIGURE. Each of the communication devices 112, 113, 114 is connected to an interface computer 111 either directly (as shown in the FIGURE) or indirectly via one of the communication devices.

The communication network 120 represents, for example, a combined Local Area Network (LAN) and Wireless Local Area Network (WLAN). The communication devices which are contained in the communication network are given the reference numerals 122, 123, 124, 125, 126, 127. While the communication devices 123, 127 exchange data wirelessly with other communication devices, the remaining communication devices are wire-based. In this communication network 120, the communication devices are likewise connected to an interface computer 121 either directly or indirectly.

The communication network 130, which represents e.g. a telecommunication network in accordance with the DECT standard, also features such an interface computer 131. The communication devices are given the reference numerals 132 to 136, wherein the communication device 136 represents e.g. a base station and the remaining communication devices represent mobile telecommunication terminals.

In this case, an identification code is assigned to each of the communication devices or to the user using them. This applies to all three communication networks.

In addition to the three communication networks listed here by way of example, a communication system 100 can also include a multiplicity of further different communication networks. In particular, it is also possible for a plurality of communication networks to have an identical infrastructure. In this case, the infrastructure of one communication network might be assigned to one network operator, while the infrastructure of another communication network is assigned to a different network operator. The above description, which includes only three communication networks, is merely selected for the purposes of the description and is not therefore intended to signify a restriction.

The interface computers 111, 121, 131 of the communication networks 110, 120, 130 set up a connection between the communication network and elements outside of the communication network. For this purpose, the interface computers 111, 121, 131 are linked to a message processing computer 201. The interface computers 111, 121, 131 of the communication systems 110, 120, 130 are used inter alia for performing the localization of the sought communication device for the communication network concerned. The precision which can be achieved in this case is dependent on the technology that is used in the communication network. The location specification can have an absolute precision of a few meters in the case of a DECT or WLAN infrastructure. In the case of a LAN or GSM infrastructure, the local protection takes place e.g. as a result of the specification of the corresponding access point, with a precision for the device which is derived therefrom. As a result of the localization, the relevant interface computer provides a location specification, e.g. in the form of a textual designation, a marking on a map or by the specification of location coordinates. Furthermore, parameters such as "currently active", "currently logged on", "when last active", etc. are determined and made available.

Although only one message processing computer 201 is represented, a communication system can feature a multiplicity of message processing computers which are arranged outside of the communication networks, and which are also responsible for different tasks. For example, one of the message processing computers could be set up for performing switching services between the interface computers of different communication networks. Another message processing computer could be set up solely for processing inquiries or for managing data, while the actual message switching takes place via a different message processing computer.

As explained in greater detail in the following description, the message processing computer 201 is not used or at least is not primarily used for data switching between communication devices of different communication networks.

A communication device 202 is linked to the message processing computer 201. Furthermore, provision can optionally be made for a computer 204 which is likewise connected to the message processing computer 201. The computer 204 contains a database of information concerning the communication devices of each communication network 111, 120, 130 which is connected to the message processing computer 201, wherein in particular information concerning the assignment of a communication device to a subscriber (i.e. a user) can be determined in this context.

The same information concerning the assignment of a communication device to a user can also be available in the respective interface computers 111, 121, 131 for a respective communication network 110, 120, 130.

Using the present infrastructure, it is possible to localize a user, who can use communication devices of a plurality of communication systems, automatically and under any identification code. In this case, it is no longer necessary to carry out a plurality of localization attempts. As is apparent from the following, an interpretation of the localization results is undertaken by a facility 203 in the message processing computer 201.

The way in which the inventive communication system 100 functions is explained in further detail below. The communication device 202, which can represent e.g. a communication terminal of a user (e.g. a computer, a mobile radio telephone and the like), transmits a request message 301 to the message processing computer 201. The request message 301 contains an identification code which is assigned to the sought user or to the subscriber devices 119, 139 thereof. For example, the identification code can be the name, an e-mail address or a telephone number of the sought user. The searching entity, i.e. the communication device 202 or its user, usually has no knowledge of which infrastructure (i.e. which subscriber device 119, 139 in which communication network) the sought user is currently using. Conventionally, therefore, a plurality of localization attempts must be undertaken by the searching entity in order to find the sought user. Using the present invention, however, this is no longer necessary.

After the message processing computer 201 has received the request message 301 of the communication device 202, provision is made for determining, by way of preparation, which subscriber devices (these can be assigned to different communication networks) are available to the sought user in principle, and which (user) identification codes are assigned to these communication devices. This is done by querying one or more databases, in which the available communication devices and the respective user identification code are stored. As described in the foregoing, such a database can be arranged centrally for all communication networks in the computer 204 outside of the communication networks 110, 120, 130. However, relevant databases can also be provided in the interface computers 111, 121, 131 of the communication networks 110, 120, 130 concerned.

The facility 203 of the message processing computer 201 therefore determines the identification code which is contained in the request message 301. After querying one or more databases, on the basis of the identification code, it is possible to ascertain which subscriber devices are assigned to this identification code. In this case, it is entirely possible for the subscriber devices to have a different identification code to that which is determined from the inquiry message. As a result of this, the communication networks which are relevant for the identification code of the inquiry message are known first. In the present exemplary embodiment, these are the communication networks 110 and 130. Corresponding communication network request messages 302 are subsequently transferred to their interface computers 111, 131. For the selected exemplary embodiment, this means that the sought user only has access to communication devices in the GSM communication network 110 and the DECT communication network 130.

In the communication request messages, the facility 203 requests further parameters from the interface computers 111, 131. These parameters can, for example, contain information indicating whether the relevant communication device 119 or 139 which is assigned to a user is currently switched on, logged on or logged off. The parameters can also contain information indicating when the communication device was last used. Since the communication device which is assigned to the sought user is based on a wireless transmission technology, information concerning the location of the base stations which have or had a connection to the communication devices is requested in particular. This information is sent back to the facility 203 in the form of parameters as response messages 303.

On the basis of the response messages, the facility 203 determines the parameters and undertakes an evaluation thereof. The parameter "currently active" has the highest significance in this case. This parameter indicates, for example, that the communication device is currently being used. This means that the currently utilized communication network is definitively identified, wherein the location of the communication device and therefore the sought user can readily be established. The evaluation step therefore effects an interpretation of the parameters which are delivered back to the facility 203, in order to obtain a clear result relating to the location of the communication device or the sought user. This result is sent back to the communication device 202 in a communication device response message 304.

The invention claimed is:

1. A communication system, comprising:
   a message processing computer;
   a plurality of communication networks, each of the networks comprising an interface computer linked to the message processing computer and a plurality of communication devices connected to the interface computer;
   at least one database, the at least one database comprising a plurality of identification codes corresponding to communication devices located within at least one communication network of the plurality of communication networks such that a query of the at least one database based on the identification code identifies any communication device assigned to the identification code; and
   wherein a first communication device transmits a request message to the message processing computer, the request message comprising a first identification code that is assigned to a user associated with a plurality of target communication devices, at least one of the target communication devices being in a different one of the plurality of communication networks than another one of the target communication devices; and
   in response to the request message, the message processing computer queries the at least one database to determine the target communication devices assigned to the first identification code such that the communication networks that the target communication devices are located within are identifiable; and
   wherein the message processing computer sends a communication network request message to each interface computer of the communication networks that the target communication devices are located within, each of the communication network request messages requesting at least one further parameter related to the target communication device in the network of that interface computer; and
   wherein each interface computer of the communication networks sends a response message having the at least one further parameter to the message processing computer; and
   wherein the message processing computer evaluates the at least one further parameter of the response messages to determine a location of a target communication device of the target communication devices that the user is currently using.

2. The communication system of claim 1 wherein the at least one further parameter comprises information provided by a plurality of base stations in one of the communication networks that indicates when the target communication device in that communication network was last used in that communication network.

3. The communication system of claim 1 wherein the message processing computer sends the location of the target communication device that the user is currently using to the first communication device.

4. The communication system of claim 1 wherein the message processing computer comprises a facility, and wherein the facility performs the querying of the at least one database to determine the target communication devices assigned to the first identification code such that the communication networks that the target communication devices are located within are identifiable, the facility performs the sending of the communication network request message to each interface computer of the communication networks that the target communication devices are located within, and the facility performs the evaluation of the at least one further parameter of the response messages to determine the location of the target communication device that the user is currently using.

5. The communication system of claim 1 wherein the at least one database comprises a plurality of databases, and wherein each database is stored in the interface computer of a respective one of the communication networks.

6. The communication system of claim 1 wherein the plurality of communication networks comprise at least one of a Local Area Network ("LAN"), a Wireless LAN ("WLAN"), a Global System for Mobile Communications ("GSM") network, and a Digital Enhanced Cordless Telecommunications ("DECT") network.

7. The communication system of claim 1 wherein the at least one further parameter comprises information that indicates whether each one of the target communication devices is currently active in a communication network or is currently logged on to a communication network.

8. The communication system of claim 1 wherein the at least one database is a database connected to the message processing computer.

9. The communication system of claim 1 wherein the message processing computer provides the location of the target communication device that the user is currently using via a textual designation of the location, a marking of the location on a map, or a specification of location coordinates of the location.

10. A method for processing a request message comprising:
   a first communication device transmitting a request message to a message processing computer, the request message comprising a first identification code that is assigned to a user associated with a plurality of target communication devices;
   the message processing computer querying at least one database, the at least one database comprising a plurality of identification codes associated with a plurality of communication devices, each of the plurality of identification codes assigned to a user associated with a plurality of target communication devices, the querying of the at least one databases identifying the target communication devices associated with the first identification code, at least one of the target communication devices being in a different one of the plurality of communication networks than another one of the target communication devices;
   the message processing computer determining communication networks that correspond to the target communication devices;
   the message processing computer sending a communication network request message to an interface computer of each of the communication networks that corresponds to the target communication devices, the communication network request message requesting at least one further parameter from the interface computer of each of the communication networks, the at least one further parameter comprising information relating to the target communication devices;

each of the interface computers of the communication networks in which at least one of the target devices is located sending a response message having the at least one further parameter to the message processing computer in response to the communication request message; and the message processing computer evaluating the at least one further parameter of each of the response messages to determine a location of a target communication device of the target communication devices that the user is currently using.

11. The method of claim 10 further comprising sending a communication device response message comprising the determined location of the target communication device that the user is currently using to the first communication device.

12. The method of claim 11 wherein the communication device response message comprises a textual designation of the determined location, a marking of the determined location on a map, or specifies location coordinates of the determined location.

13. The method of claim 10 wherein the at least one further parameter of each response message comprises information provided by a plurality of base stations in the respective communication network that corresponds to the target communication device, the at least one further parameter indicating when the target communication device of that communication network was last used in that communication network.

14. The method of claim 10 wherein the at least one database comprises a plurality of databases, and wherein each database is stored in the interface computer of each communication network.

15. The method of claim 10 wherein the at least one database is located in a database connected to the message processing computer.

16. The method of claim 10 wherein the plurality of communication networks comprise at least one of a Local Area Network ("LAN"), a Wireless LAN ("WLAN"), a Global System for Mobile Communications ("GSM") network, and a Digital Enhanced Cordless Telecommunications ("DECT") network.

17. The method of claim 10 wherein the information related to the target communication devices comprises information that indicates whether each target communication device is currently active in the communication network in which that target communication device is located or is currently logged on to that communication network.

18. The method of claim 10 wherein the message processing computer comprises a facility, and wherein the facility performs the querying of the at least one database, the facility performs the determining of the communication network that corresponds to each target communication device, the facility performs the sending of the communication network request message to the interface computer of each of the communication networks that correspond to each target communication device, and the facility performs the evaluating of the at least one further parameter of the response message to determine the location of the target communication device that the user is currently using.

19. The communication system of claim 1 wherein the at least one database also having identities of subscribers such that each subscriber is associated with at least one of the communication devices.

* * * * *